3,028,346
COVULCANIZATE OF CHLORINATED BUTYL RUBBER AND HIGHLY UNSATURATED RUBBER, AND PROCESS FOR PREPARING SAME
Theodore Lemiszka, Roselle, Delmer L. Cottle, Highland Park, and Leon Sherwood Minckler, Jr., Metuchen, N.J., assignors to Esso Research and Engineering Company, a corporation of Delaware
Filed Sept. 18, 1958, Ser. No. 761,856
6 Claims. (Cl. 260—5)

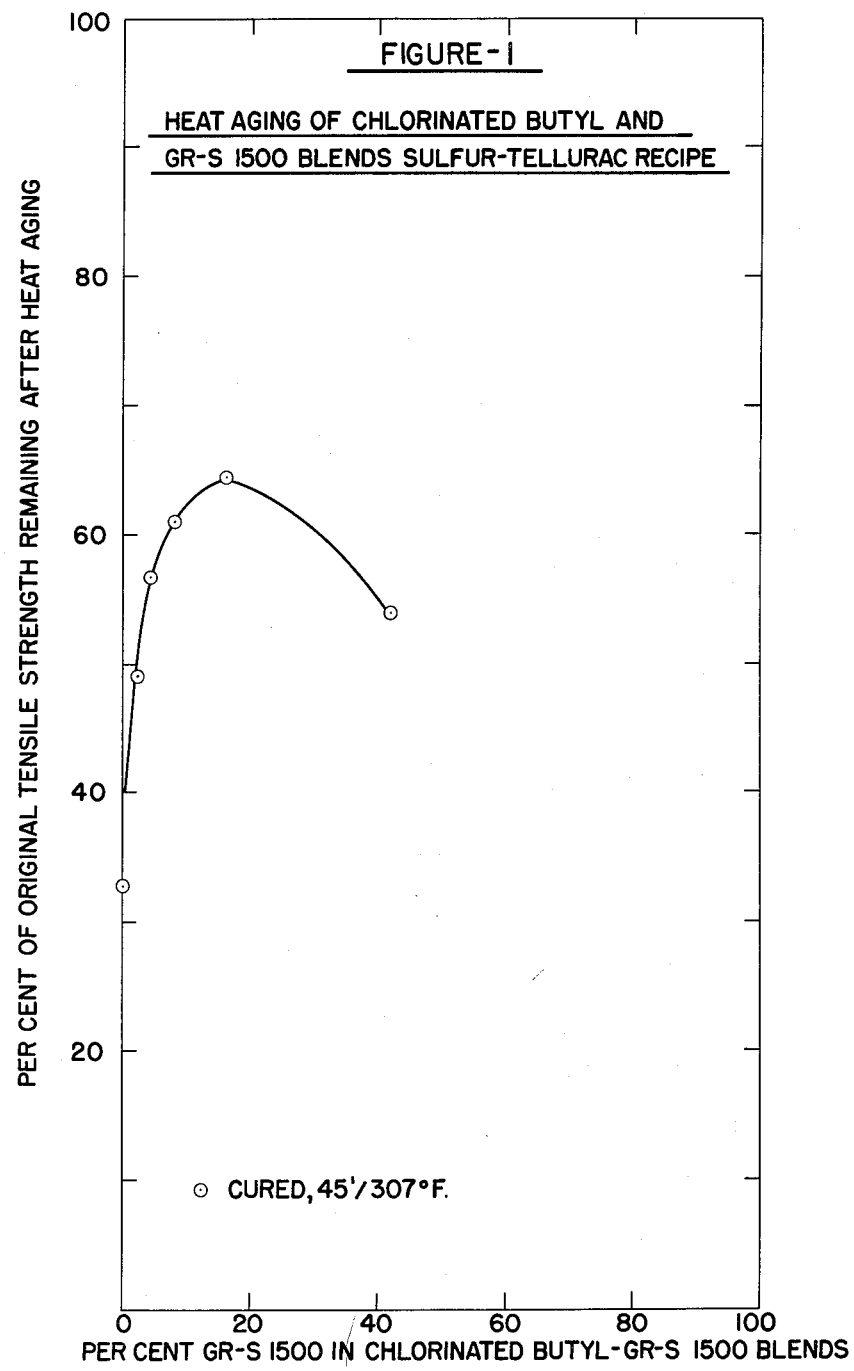

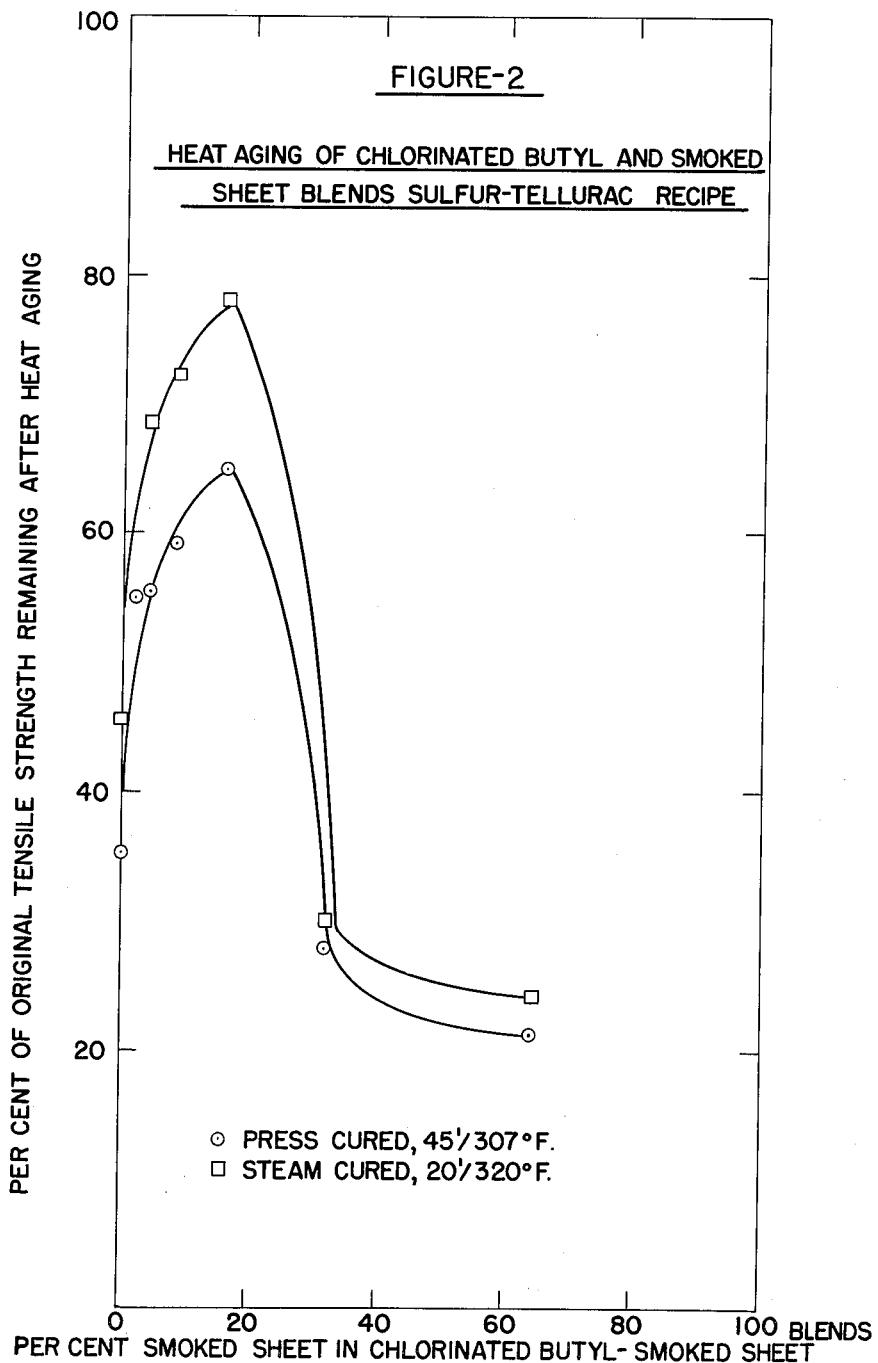

This invention relates to the production of halogenated butyl rubber vulcanizates of improved heat stability. More particularly, the present invention relates to covulcanizing halogenated butyl rubber with critically small amounts of highly unsaturated rubbers to obtain improved resistance to heat aging.

Butyl rubber, being the most low unsaturation vulcanizable rubbery copolymer commercially available and having an iodine number of about 1 to 50, is known to have vastly superior heat stability than such highly unsaturated rubbers as natural rubber, diene-styrene copolymers, diene-nitrile copolymers, polyhaloalkadiene copolymers, etc., which all have high iodine numbers of about 200 to 400. It has also been proposed to covulcanize indiscriminate quantities of such highly unsaturated rubbers with halogenated butyl rubbery copolymers.

It has now been discovered that, although it would be expected that the presence of any amounts of highly unsaturated rubbers would very much adversely affect the heat stability of halogenated butyl rubbers, to the contrary the addition of critically small amounts of such highly unsaturated rubbers to halogenated butyl rubbers, and curing the mixture with sulfur plus accelerators, surprisingly greatly increases the heat stability of the resulting composition.

The invention will be best understood from the following description read in connection with the accompanying drawings wherein the two figures comprise graphs of data depicting the critical amounts of high unsaturation rubbers convulcanized in accordance with the present invention to produce superior heat resistance or heat stability of halogenated butyl rubber.

According to the present invention, about 80 to 99 parts by weight of halogenated butyl rubber is blended with about 1 to 20, advantageously about 2 to 16 and preferably about 4 to 8 parts by weight of a highly unsaturated rubber or rubbers such as natural rubber, GR-S rubber or mixtures thereof and subsequently convulcanized in the presence of 1 to 5 parts of added elemental sulfur, and 1 to 10 parts of a basic polyvalent metal oxide, e.g. zinc oxide, or MgO, etc., and also 1 to 5 parts of vulcanization accelerators, preferably ultra-accelerators of the thiocarbamate type, polyalkyl thiuram sulfides, primary or polyfunctional organic amines, polymethylol phenolic resins, mercaptobenzothiazole, benzothiazyl disulfide, quinone dioxime and its derivatives, stannous chloride, etc. The compounded compositions may contain, per 100 parts by weight of mixed rubber, also about 10 to 100 parts by weight of a filler such as clays, silica, alumina or especially carbon blacks, as well as plasticizers, antioxidants, etc. It is preferred to use 1–10% of rubbers having an iodine number of 300–400, but about 2–20% if the iodine number is 200–300.

Covulcanization of the foregoing compounded rubber stocks may be effected by steam or press curing at about 200° to 450° F. inversely for 1 minute to 5 hours or more, advantageously at about 225° to 400° F. for 3 minutes to 3 hours, or preferably at about 250° to 375° F. for about 5 to 100 minutes (e.g. 10 to 60 minutes). The vulcanizates formed have been found to exhibit particularly good resistance to heat aging, which makes them suitable for many products. It will be noted that for optimum ozone resistance, 2 to 6% or so of the highly unsaturated rubbers have been used in blends with chlorinated butyl rubber, but such blends must be cured with a non-sulfur cure.

The covulcanizates of this invention, after heat aging in a circulating air oven at 300° F. for 72 hours, still have a tensile strength of at least 1,000 p.s.i., generally at least 1,200, and preferably at least 1,400 p.s.i., and have an elongation of at least 140%, and generally at least 200%. In contrast, chlorinated butyl rubber alone, or blends containing more than 20%, or 30% of GR-S or hevea, have much lower heat-aged tensile strength and elongation values.

Butyl rubber is a low unsaturation rubbery copolymer containing about 85 to 99.5% of a $C_4$ to $C_7$ isoolefin, such as isobutylene, 2-methyl-1-butene or 3-methyl-1-butene and about 0.5 to 15% of a $C_4$ to $C_{14}$ multiolefin such as myrcene, butadiene, cyclopentadiene or particularly isoprene. It generally has a Staudinger molecular weight between about 20,000 and 300,000, a Wijs iodine number between about 0.5 and 50, and a mole percent unsaturation between about 0.5 and 15.

In producing halogenated butyl rubber, unmodified, unvulcanized butyl rubber is carefully halogenated until it contains about at least 0.5 weight percent (preferably at least about 0.8 weight percent), but not more than about "X" weight percent of combined halogen wherein:

$$X = \frac{M_3 L}{(100 - L(M_1 + L(M_2 + M_3))} \times 100$$

and:

L = mole percent of the multiolefin in the polymer
$M_1$ = molecular weight of the isoolefin
$M_2$ = molecular weight of the multiolefin
$M_3$ = atomic weight of the halogen Generally, there should be at least about 1.0 weight percent of combined halogen in the polymer but not more than about one atom of chlorine or 2 or 3 atoms of bromine combined in the polymer per molecule of multiolefin present therein; i.e., per double bond in the polymer.

Suitable halogenating agents which may be employed are gaseous chlorine, liquid bromine, alkali metal hypochlorites, or hypobromites, sulfur chlorides or bromides (particularly oxygenated sulfur chlorides or bromides), pyridinium chloride perchloride, N-bromo-succinimide, iodine monochloride, tri-bromophenol bromide, N-chloroacetamide, N,N'-dimethyl-5,5-dichloro or dibromo hydantoin, and other common halogenating agents.

The halogenation is generally conducted at about −50° C. to about +200° C., advantageously at about 0° to 100° C., preferably at about 20° to 50° C. especially when using elemental halogen, (room temperature being satisfactory in most instances) depending upon the particular halogenation agent, for about one minute to several hours. An advantageous pressure range is from about 0.5 to 400 p.s.i.a.; atmospheric pressure being satisfactory. The halogenation conditions are regulated to halogenate the rubbery copolymer to the extent above mentioned.

The halogenation may be accomplished in various ways, for instance by direct halogenation of the solid copolymer. Another process, which is preferred, comprises preparing a solution of the copolymer in a suitable inert liquid organic solvent such as a $C_3$ to $C_{10}$, or preferably, a $C_5$ to $C_8$, inert hydrocarbon, examples of which are hexane, heptane, naphtha, mineral spirits, cyclohexane, alkyl substituted cycloparaffins, benzene, or halogenated derivatives of saturated hydrocarbons, chlorobenzene, chloroform, trichlorethane, carbon tetrachloride, mixtures thereof, etc., and adding thereto gaseous chlorine, liquid bromine, or other halogenating agent, which may optionally be in solution, such as dissolved in an inert hydrocarbon, an alkyl chloride, carbon tetrachloride, etc.

The concentration of the butyl rubber in the solvent will depend upon the type of reactor, molecular weight of the butyl rubber, etc. In general, the concentration of a butyl rubber having a viscosity average molecular weight of about 200,000 to about 1,500,000, if the solvent is a substantially inert hydrocarbon, will be between 1 and 30% by weight, preferably about 5 to 20%. If chlorine gas is employed to chlorinate such a butyl rubber solution, the chlorine may also be diluted with up to about 50 times its volume, preferably about 0.1 to 5.0 times its volume of an inert gas such as nitrogen, methane, ethane, carbon dioxide, etc.

The resulting halogenated butyl rubber polymer may be recovered in various manners. The polymer may be precipitated with acetone, or any other non-solvent for the modified butyl rubber formed, and dried under about 1 to 760 millimeters or higher of mercury pressure absolute, at about 0° to 180° C., preferably at about 50° to 150° C. (e.g., 70° C.). Other methods of recovering the halogenated butyl rubber polymer from the hydrocarbon solution are by conventional spray or drum drying techniques. Alternatively, the halogenated butyl rubber solution may be injected into a vessel containing agitated water heated to a temperature sufficient to flash off the rubber solvent and form an aqueous slurry of the halogenated butyl rubber, from which the halogenated butyl rubber may then be separated by filtration, dried and recovered as a "crumb" or as a dense sheet or slab by conventional milling and/or extruding procedures. The halogentaed copolymer formed advantageously has a viscosity average molecular weight between about 200,000 and 1,500,000 and a mole percent unsaturation of between about 0.5 and 15.0, preferably about 0.6 to 5.0.

In order to more fully illustrate the present invention, the following examples are given wherein reference will be made to the accompanying drawing depicting the data in the examples.

Referring now to the accompanying drawings, the vertical scale of each graph gives the percent of original tensile strength remaining after heat aging (in a circulating air oven at 300° F. for 72 hours). Also, the horizontal scale of each drawing shows the percent of either GR-S rubber or natural rubber (smoked sheet) in the blends with chlorinated butyl rubber. The samples compounded as indicated below were either cured in a press for 45 minutes at 307° F. or steam cured for 20 minutes at 320° F. In all examples the chlorinated butyl rubber used had a Mooney viscosity (8 minutes at 212° F.) of 65, a mole percent unsaturation of 1.3, a viscosity average molecular weight of 475,000 and a combined chlorine content of 1.1%. It was made by gaseous chlorination at room temperature of a solution of butyl rubber in hexane. The details of compounding were as follows:

EXAMPLE 1

Blends of chlorinated butyl rubber were prepared with 0, 2, 4, 8 and 16% of either GR-S–1500 (75.5% butadiene, 23.5% styrene copolymer of about 52 Mooney). These were compounded in the following formulation:

| Component: | Parts by weight |
|---|---|
| Total polymers | 100 |
| HAF carbon black | 50 |
| Stearic acid | 1 |
| Zinc oxide | 5 |
| Sulfur | 2 |
| Tellurium diethyl dithiocarbamate (Tellurac) [1] | 1 |

[1] This compounding recipe is designated as "sulfur-Tellurac" recipe in Figure 1.

The heat aging characteristics of the rubbery blends were subsequently determined by press curing, at 307° F. for 45 minutes, and then oven aging the unaged control samples in a circulating hot air over at 300° F. for 72 hours.

The physical properties (tensile strength, 300% modulus and percent elongation) of the blends before and after heat aging are given in Table I. The percent of tensile strength remaining after heat aging is also shown in Table I at the right, and is plotted in FIGURE 1.

EXAMPLE 2

Similar blends, using smoked sheet instead of the GR-S, were made and cured with the same compounding formulation as in Example 1, but not only press cured at 307° F. for 45 minutes, but also steam cured at 320° F. for 20 minutes. The test data obtained are shown in Tables II a and b; and the percent tensile remaining after heat aging is plotted in FIGURE 2.

*Table I*

HEAT AGING OF CHLORINATED BUTYL RUBBER AND GR-S 1500 BLENDS

Sulfur-Tellurac Recipe, Cured, 45'/307°F.

| Chlorinated Butyl Rubber, Weight percent | GR-S 1500, Weight percent | 300% Modulus | | Tensile | | Elongation | | Percent of Original Tensile Strength Remaining after Heat Aging |
|---|---|---|---|---|---|---|---|---|
| | | Original | Heat Aged | Original | Heat Aged | Original | Heat Aged | |
| 100 | 0 | 2,300 | 640 | 2,705 | 890 | 355 | 440 | 32.8 |
| 98 | 2 | 2,200 | 950 | 2,695 | 1,320 | 360 | 450 | 48.9 |
| 96 | 4 | | | 2,825 | 1,605 | 370 | 325 | 56.8 |
| 92 | 8 | | | 2,635 | 1,600 | 330 | 280 | 60.8 |
| 84 | 16 | | | 2,375 | 1,525 | 255 | 190 | 64.2 |
| 68 | 32 | | | 2,125 | 1,145 | 125 | 30 | 53.8 |

*Table II(a)*

HEAT AGING OF CHLORINATED BUTYL RUBBER AND SMOKED SHEET BLENDS

Sulfur-Tellurac Recipe, Press Cured, 45'/307°F.

| Chlorinated Butyl Rubber, Weight percent | Smoked Sheet, Weight percent | 300% Modulus | | Tensile | | Elongation | | Percent of Original Tensile Strength Remaining after Heat Aging |
|---|---|---|---|---|---|---|---|---|
| | | Original | Heat Aged | Original | Heat Aged | Original | Heat Aged | |
| 100 | 0 | 2,300 | 725 | 2,705 | 950 | 355 | 450 | 35.1 |
| 98 | 2 | 2,350 | 1200 | 2,600 | 1,430 | 355 | 405 | 55.0 |
| 96 | 4 | 2,325 | 1160 | 2,535 | 1,410 | 325 | 355 | 55.6 |
| 92 | 8 | 2,325 | | 2,545 | 1,505 | 340 | 280 | 59.1 |
| 84 | 16 | | | 1,605 | 1,045 | 255 | 240 | 65.1 |
| 68 | 32 | | | 1,900 | 530 | 150 | | 27.9 |

Table II(b)

Sulfur-Tellurac Recipe, Steam Cured, 20'/320°F.

| Chlorinated Butyl Rubber, Weight percent | Smoked Sheet, Weight percent | 300% Modulus | | Tensile | | Elongation | | Percent of Original Tensile Strength Remaining after Heat Aging |
|---|---|---|---|---|---|---|---|---|
| | | Original | Heat Aged | Original | Heat Aged | Original | Heat Aged | |
| 100 | 0 | 1,350 | 720 | 1,905 | 865 | 385 | 385 | 45.4 |
| 98 | 2 | 1,600 | 1,115 | 2,105 | 1,260 | 375 | 355 | 59.9 |
| 96 | 4 | 1,600 | 1,450 | 2,005 | 1,375 | 370 | 300 | 68.5 |
| 92 | 8 | 1,700 | | 2,230 | 1,610 | 395 | 285 | 72.2 |
| 84 | 16 | | | 1,410 | 1,100 | 215 | 140 | 78.1 |
| 68 | 32 | | | 1,695 | 510 | 135 | 10 | 30.0 |

The data in Tables I and II and in FIGURES 1 and 2 show that the maximum amount of original tensile strength retained occurs at between about 10 and 20% GR-S or smoked sheets. This same data also shows that the vulcanizates were not only more stable to heat than the chlorinated butyl rubber alone but also more stable than blends containing higher amounts, such as 32%, of either the GR-S-1500 or the smoked sheet (natural rubber). The best over-all combination of heat aged properties, e.g. heat aged tensile and elongation, as well as percent tensile retained, is obtained with blends containing 4 to 16% of the GR-S-1500, or 2 to 8% of smoked sheet, all being cured with sulfur, accelerator and zinc oxide, and other compounding ingredients.

In the appended claims, the expression "butyl rubber" is intended to mean a low unsaturation rubbery copolymer of about 85–99.5% of a $C_4$–$C_7$ isoolefin, and about 0.5 to 15% of a $C_4$–$C_{14}$ isoolefin, said copolymer having a Staudinger or molecular weight of about 20,000 to 300,000, and a Wijs iodine number of about 0.5 to 50.

Resort may be had to modifications and variations of the disclosed embodiments without departing from the spirit of the invention or the scope of the appended claims.

What is claimed is:

1. A co-vulcanizate of excellent heat stability comprising: a minor proportion of a highly unsaturated rubber chosen from the group consisting of 2 to 16 parts by weight of natural rubber and 4 to 16 parts by weight of diene-styrene copolymers; sufficient chlorinated butyl rubber to give a total concentration of chlorinated butyl rubber and said highly unsaturated rubber of 100 parts by weight, said chlorinated butyl rubber being a copolymer of 85 to 99.5 wt. percent of a $C_4$ to $C_7$ isoolefin and 0.5 to 15 wt. percent of a $C_4$ to $C_{14}$ multiolefin, and having a mole percent unsaturation of about 0.5 to 15, said chlorinated butyl rubber copolymer containing at least 0.5 wt. percent chlorine but no more than one atom of chlorine per double bond in said copolymer; sulfur; a vulcanization accelerator; and a basic polyvalent metal oxide.

2. A covulcanizate according to claim 1 in which the covulcanization has been performed in the presence of zinc oxide.

3. A covulcanizate according to claim 1 in which the covulcanizate has been produced in the presence of an admixture of zinc oxide and a derivative of thiocarbamic acid.

4. A covulcanizate according to claim 1, having after a heat aging test at 300° F. for 72 hours, a tensile strength of at least 1,000 p.s.i., an elongation of at least 140%, and a percent of original tensile remaining after heat aging for 72 hours in a circulating hot air oven at 300° F. of at least about 50%.

5. A composition comprising a covulcanizable admixture of high resistance to heat, said composition containing a minor proportion of a highly unsaturated rubber chosen from the group consisting of 2 to 16 parts by weight of natural rubber and 4 to 16 parts by weight of diene-styrene copolymers; sufficient chlorinated butyl rubber as to give a total concentration of chlorinated butyl rubber and said highly unsaturated rubber of 100 parts by weight, said chlorinated butyl rubber being a copolymer of 85 to 99.5 wt. percent of a $C_4$ to $C_7$ isoolefin and 0.5 to 15 wt. percent of a $C_4$ to $C_{14}$ multiolefin, and having a mole percent unsaturation of about 0.5 to 15, said composition further containing 1–5 parts of elemental sulfur, 1–5 parts of a vulcanization accelerator, and about 1–10 parts of a basic polyvalent metal oxide, said chlorinated butyl rubber containing at least 0.5 wt. percent chlorine but no more than one atom of chlorine per double bond in the copolymer.

6. A process for preparing co-vulcanized blends having excellent heat stability which comprises, mixing a minor proportion of a highly unsaturated rubber chosen from the group consisting of 2 to 16 parts by weight of natural rubber and 4 to 16 parts by weight of diene-styrene copolymers; sufficient chlorinated butyl rubber to give a total concentration of chlorinated butyl rubber and said highly unsaturated rubber of 100 parts by weight, said chlorinated butyl rubber being a copolymer of 85 to 99.5 wt. percent of a $C_4$ to $C_7$ isoolefin and 0.5 to 15 wt. percent of a $C_4$ to $C_{14}$ multiolefin, and having a mole percent unsaturation of about 0.5 to 15 and containing 0.5 to 1.5% chlorine; vulcanizing amounts of about 1 to 5 parts by weight of sulfur, 1 to 2 parts by weight of tellurium diethyl dithiocarbamate and 1 to 10 parts by weight of zinc oxide; and co-vulcanizing the resulting mixture by heating at a temperature level of about 250° F. to 375° F. for about 5 to 100 minutes so as to produce a co-vulcanizate exhibiting high resistance to heat.

References Cited in the file of this patent

UNITED STATES PATENTS

| | | |
|---|---|---|
| 2,631,984 | Crawford et al. | Mar. 17, 1953 |
| 2,732,354 | Morrissey et al. | Jan. 24, 1956 |